United States Patent
Wang et al.

(10) Patent No.: US 11,446,773 B2
(45) Date of Patent: Sep. 20, 2022

(54) SUPER304H STEEL WELDING WIRE CAPABLE OF RESISTING HIGH-TEMPERATURE CREEP AND AGING EMBRITTLEMENT

(71) Applicants: WUHAN UNIVERSITY, Wuhan (CN); POWER CHINA HENAN ENGINEERING CO., LTD., Zhengzhou (CN)

(72) Inventors: Xue Wang, Wuhan (CN); You Li, Wuhan (CN); Yucheng Chen, Wuhan (CN); Dongxu Chen, Zhengzhou (CN); Jianhua Sun, Zhengzhou (CN); Liquan Li, Zhengzhou (CN); Meihua Guo, Zhengzhou (CN)

(73) Assignees: WUHAN UNIVERSITY, Wuhan (CN); POWER CHINA HENAN ENGINEERING CO., LTD., Zhengzhou (CN)

( * ) Notice: Subject to any disclaimer, the term of this patent is extended or adjusted under 35 U.S.C. 154(b) by 9 days.

(21) Appl. No.: 16/706,747

(22) Filed: Dec. 8, 2019

(65) Prior Publication Data

US 2020/0108472 A1    Apr. 9, 2020

Related U.S. Application Data

(63) Continuation of application No. PCT/CN2018/103694, filed on Sep. 1, 2018.

(30) Foreign Application Priority Data

Sep. 11, 2017 (CN) .......................... 201710812790.7

(51) Int. Cl.
*B23K 35/30* (2006.01)
*B23K 35/02* (2006.01)
(Continued)

(52) U.S. Cl.
CPC ...... *B23K 35/3086* (2013.01); *B23K 35/0261* (2013.01); *C22C 38/001* (2013.01);
(Continued)

(58) Field of Classification Search
CPC ............ B23K 35/3086; B23K 35/0261; B23K 2103/05; C22C 38/001; C22C 38/002;
(Continued)

(56) References Cited

U.S. PATENT DOCUMENTS 9,289,859 B2    3/2016    Nako et al.
2008/0093351 A1    4/2008    Matsushita et al.

FOREIGN PATENT DOCUMENTS

CN    101412160 A    4/2009
CN    101862924 A    10/2010
(Continued)

OTHER PUBLICATIONS

Ma et al., CN 101412160 B machine translation, Mar. 9, 2011, entire translation (Year: 2011).*

(Continued)

*Primary Examiner* — Humera N. Sheikh
*Assistant Examiner* — Katherine A Christy (57) ABSTRACT

A Super304H steel welding wire capable of resisting high-temperature creep and aging embrittlement, includes the following chemical components in percentage by mass: 0.04-0.1% of C, 0.4-1.5% of Mn, 7.5-12.5% of Ni, ≤0.5% of Si, 17.0-19.0% of Cr, ≤0.4% of Mo, 2.5-3.5% of Cu, 0.3-0.6% of Nb, 0.05-0.12% of N, ≤0.01% of S, ≤0.02% of P and the balance of Fe and other inevitable impurity elements. The welding wire can be used for welding of Super304H steel used in ultra super critical thermal power stations, has a weld being in a double-phase structure of austenite and a small amount of ferrite (volume fraction is 3-12%), and has good hot cracking resistance capability.

5 Claims, 4 Drawing Sheets (51) Int. Cl.
*C22C 38/00* (2006.01)
*C22C 38/02* (2006.01)
*C22C 38/04* (2006.01)
*C22C 38/42* (2006.01)
*C22C 38/44* (2006.01)
*C22C 38/48* (2006.01)
*B23K 103/04* (2006.01)

(52) U.S. Cl.
CPC ............ *C22C 38/002* (2013.01); *C22C 38/02* (2013.01); *C22C 38/04* (2013.01); *C22C 38/42* (2013.01); *C22C 38/44* (2013.01); *C22C 38/48* (2013.01); *B23K 2103/05* (2018.08)

(58) Field of Classification Search
CPC ......... C22C 38/02; C22C 38/04; C22C 38/42; C22C 38/44; C22C 38/48

USPC ......................................................... 428/576
See application file for complete search history.

(56) References Cited

FOREIGN PATENT DOCUMENTS

| | | | |
|---|---|---|---|
| CN | 101412160 B | * | 3/2011 |
| CN | 102649202 A | | 8/2012 |
| CN | 107398656 A | | 11/2017 |
| JP | 11291085 A | | 10/1999 |

OTHER PUBLICATIONS

Internation Search Report of PCT/CN2018/103694, dated Oct. 26, 2018.

* cited by examiner

SUPER304H STEEL WELDING WIRE CAPABLE OF RESISTING HIGH-TEMPERATURE CREEP AND AGING EMBRITTLEMENT

CROSS-REFERENCE TO RELATED APPLICATIONS

This application is a continuation of International Patent Application No. PCT/CN2018/103694 with a filing date of Sep. 1, 2018, designating the United States, now pending, and further claims priority to Chinese Patent Application No. 201710812790.7 with a filing date of Sep. 11, 2017. The content of the aforementioned applications, including any intervening amendments thereto, are incorporated herein by reference.

TECHNICAL FIELD

The disclosure belongs to the field of thermal-resistant steel, and particularly relates to a Super304H steel welding material for a supercritical thermal power generating unit.

BACKGROUND OF THE PRESENT INVENTION

Super304H is a 18-8 series austenite thermal-resistant stainless steel developed by reducing the upper limit of the content of Mn and adding Cu, Nb and a certain amount of N on the basis of TP304H. The UNS number of Super304H in ASME SA 213-2010 is S30432, and is named 10Cr18Ni9NbCu3BN in GB5310-2008. This steel has excellent high-temperature creep resistance, the allowable stress of this steel above 625° C. is 30-50% higher than that of TP347H.

The aging embrittlement tendency of this steel is small, and the room-temperature impact energy after long-term aging at 550-750° C. is maintained above 100 J. Due to its excellent high-temperature high-pressure service performance, the Super304H steel is widely applied to superheater tubes and reheater tubes of an ultrasuper critical boiler (USCB. In USCBs, a large amount of welds of Super304H superheater tubes and reheater tubes are present, which are generally welded by using a GTAW method where a filling material needs to be added, and therefore it is required for a large amount of matched welding materials (welding wires). At present, there are two optional welding wires, one is an austenite steel homogenous welding wire whose components are close to those of Super304H steel, has representative brands being a YT-304H welding wire from Sumitomo solution welding Co., Ltd. of Nippon Steel and a Thermanit 304H Cu welding wire from Böhler welding group (former Thyssen welding). Their components are basically the same. The components of domestic welding wires described in a Chinese patent "STAINLESS STEEL WELDING WIRE" with application No. 201110044039. X and a patent "TUNGSTEN ARGON ARC WELDING WIRE FOR STAINLESS STEEL WELDING" with application No. 200810227692.8 are close to those of two foreign welding wires or comprise their component ranges. Li Xin-mei et al. find that the room-temperature impact energy of the YT-304H welding wire after 650° C.×500 haging is decreased by more than 80%. The inventors of this patent find that the room-temperature impact toughness of the YT-304H welding wire after 650° C.×500 haging is only 24 J/cm$^2$, and the creep fracture strength of the Super304H joint filled with the YT-304H welding wire is low. At present, another welding material selection solution for welding the Super304H steel is to use a high-grade nickel base welding wire, such as Thermanit 617 (ERNiCrMo-1) welding wire from Böhler welding group. This welding wire has poor process performance, is prone to defects such as lack of penetration and fusion, and is high in repair rate, high in cost and expensive in price. Therefore, there is a need for a Super304H steel homogeneous welding wire with good welding technology, high temperature service performance and low cost at present.

SUMMARY OF PRESENT INVENTION

For the problems existing in the prior art, the technical solution adopted by the disclosure to solve the problems existing in the prior art is as follows:

A Super304H steel welding wire capable of resisting high-temperature creep and aging embrittlement, comprising the following chemical components in percentage by mass: 0.04-0.1% of C, 0.4-1.5% of Mn, 7.5-12.5% of Ni, ≤50.5% of Si, 17.0-19.0% of Cr, ≤0.4% of Mo, 2.5-3.5% of Cu, 0.3-0.6% of Nb, 0.05-0.12% of N, ≤0.01% of S, 0.02% of P and the balance of Fe and other inevitable impurity elements.

Preferably, C: 0.06-0.08%, Mn: 0.6-1.0%, Ni:8.5-12.5%, and Mo: 0-0.2%.

A welding method used in application of the welding wire in Super304H steel welding is argon tungsten-arc welding (GTAW).

When the diameter of the welding wire is 1.0 mm, the welding current is 140-200 A, the arc voltage is 9-11 V, the wire feed speed is 85-350 mm/min, the protective gas flow is 16-20 L/min, and the interlayer temperature is controlled below 100° C.

When the diameter of the welding wire is 2.4 mm, the welding current is 80-110 A, the arc welding voltage is 9-14 V, the welding speed is 50-100 mm/min, the protective gas flow is 8-10 L/min, and the interlayer temperature is controlled below 100° C.

The objective of the disclosure is to provide a welding wire suitable for welding Super304H steel. This welding wire is an austenite steel material, which has the advantages of good welding process performance and low cost as compared with the nickel-based welding wire material, and has small aging embrittlement tendency and good high-temperature creep resistance as compared with austenite steel welding wires having brands such as YT-304H.

Figure 1:
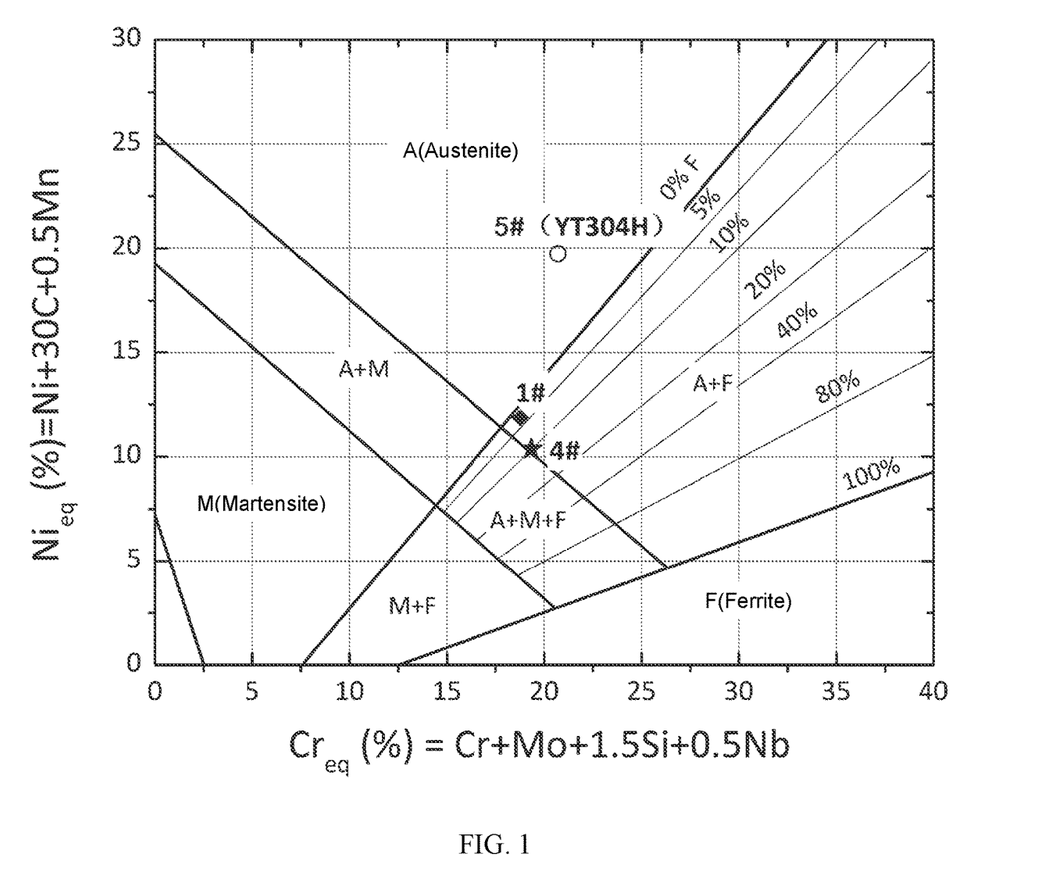
FIG. 1 is comparison of calculation results of weld structures of a welding wire of the disclosure and a YT-304H welding wire.
Figure 2:
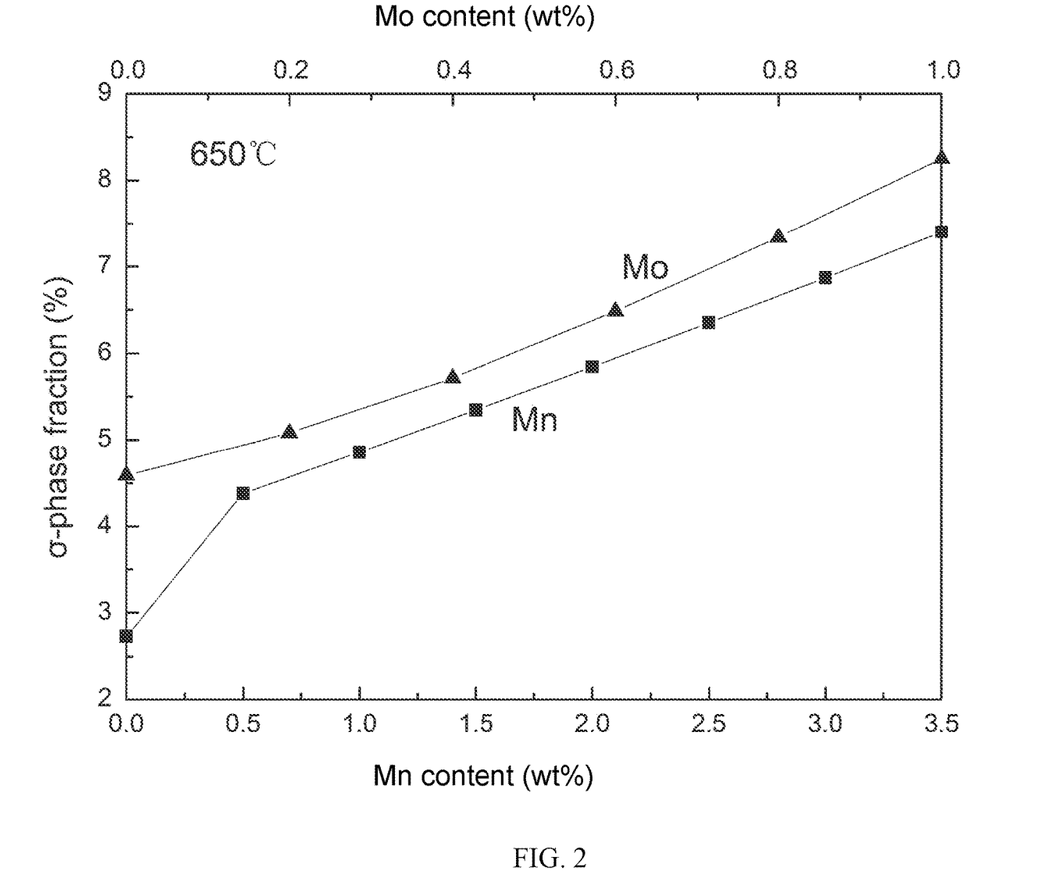
FIG. 2 is a thermodynamic calculation result of the influence of Mn and Mo contents on a a phase of a Super304H weld.

The thinking of the disclosure is to regulate component design of YT-304H welding wires and significantly reduce the content of Mn in the nickel equivalent element Mn and aims to change the single austenite structure of the weld into the double-phase structure of austenite+a small amount of ferrite (volume fraction is 3-12%), as shown in FIG. 1. It is noted that although a Schaeffler weld structure chart shown in FIG. 1 predicts that the ferrite content of the Super304H weld may deviate from an actual value to a certain degree, FIG. 1 clearly shows that the weld of the YT-304H welding wire is of a single austenite structure, while the chromium equivalent is similar to that of the YT-304H weld, and the ferrite begins to appear in the weld of a 1 # welding wire with significantly reduced nickel equivalent, and the content of ferrite in the weld of 2 # welding wire with lower nickel equivalent is further increased. The experimental results show that compared with the weld having the single austenitic structure, the double-phase structure weld in which 3-12% of ferrite is retained can prevent the aggregation of $M_{23}C_6$ carbide at the grain boundary in the process of high-temperature aging, alleviate the aging embrittlement and improve the high-temperature creep resistance. In addition, retaining a small amount of ferrite in the weld can effectively improve hot cracking resistance capability, and does not need to prevent hot cracking by greatly increasing the content of Mn and controlling the contents of impurities such as S and P in an extremely low level, thereby reducing the production cost of welding materials. Through thermodynamic calculation, it is found that another expected effect of reducing the content of Mn in the Super304H weld is to reduce the generation of a phase, as shown in FIG. 2, the a phase is a brittle, hard and non-magnetic iron chromium intermetallic compound phase which has a complicated crystal structure. When its volume fraction is high, the toughness, ductility and high temperature creep performance are reduced. Although the ferrite in the weld is easily changed into the a phase in the process of high-temperature aging, the inventor of this patent has found that the a phase changed from a small amount of ferrite is very small in volume fraction, is dispersed in the weld, and has little influence on impact toughness and high-temperature creep performance of the Super304H weld.

Regulation of another main component of the Super304H steel welding wire provided by the disclosure is to properly reduce the content of the Ni element in the YT-304H welding wire, the content of Ni in YT-304H is over 16%, the content of Ni in the Super304H steel welding wire provided by the disclosure is reduced within 12.5%. The objective is to form a small amount of ferrite to indirectly inhibit the aggregation of $M_{23}C_6$ carbide and meanwhile directly reduce the generation amount of $M_{23}C_6$ carbide. Since the Ni element improves the activity of the C atom, the solubility of C in the austenite is reduced and the tendency of generating $M_{23}C_6$ carbide from C austenite steel is enlarged. Different from the extent of regulating the content of Mn, the disclosure does not significantly reduce the content of the Ni element to a level similar to that of Super304H steel, on the one aspect, which is conducive to obtaining a small amount of ferrite, and one the other aspect, aims to prevent formation of too much a phases in the weld by utilizing the inhibition on generation of a phases.

Compared with YT-304H, no or a small amount of Mo elements are added in the Super304H steel welding wire provided by the disclosure. Although Mo has the effect of solution strengthening, it can improve the high temperature creep resistance of the material. However, Mo is a ferrite-forming element. Increasing the Mo content in a case that the nickel equivalent is reduced will obviously increase the equivalent of chromium, and increasing the ferrite content is not conducive to the aging performance and high temperature creep performance of the weld. In addition, the patent inventor finds through thermodynamic calculation that increasing the content of Mo significantly increases the formation of the a phase, as shown in FIG. 2. In order to control the content of the a phase, the disclosure controls the content of Mo in a lower level.

Figure 3:
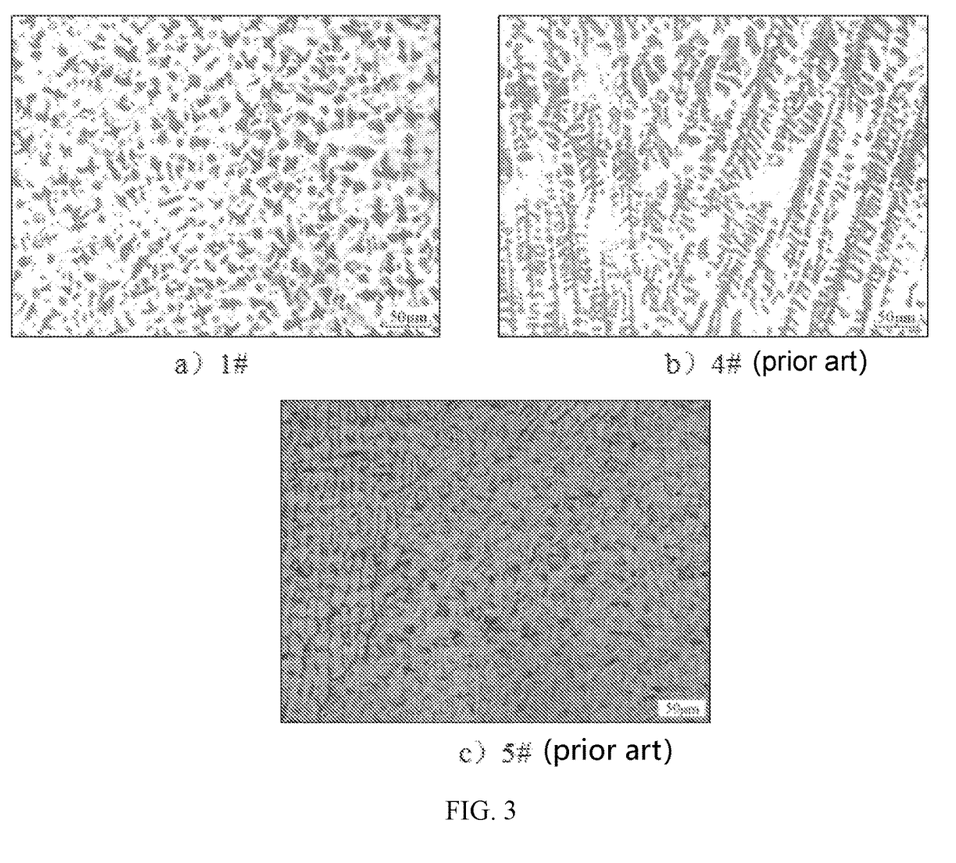
FIG. 3 is comparison of microstructures of welds of a welding wire (1 #) of the disclosure, a comparison example welding wire (4 #) and a YT-304H welding wire (5 #).

In summary, the effects and reasons of selection ranges of various chemical elements in the welding wire provided by the disclosure are as follows:

Carbon: C is a strong austenite forming element, which can strongly inhibit the formation of ferrite. If the content of C is too low, excessive ferrite will be formed in the weld, as shown in FIG. 3b. Too much ferrite can promote the generation of the a phase, aggravate aging embrittlement, and is not conducive to creep performance. When the content of C is too high, the ferrite is completely inhibited, the weld is of a single austenite structure, and the hot cracking resistance capability of the weld is reduced. C is an important strengthening element in austenitic heat-resistant steel, which can form carbides or carbonitrides with Cr, Nb and N besides solution strengthening, so as to improve creep strength. However, if the content of C is too high, the precipitation and growth of $M_{23}C_6$ carbides at the grain boundary will be increased, and the aging embrittlement will be promoted. In the disclosure, the control principle of the C content is that the content of ferrite is reduced as much as possible on the premise that a small amount of ferrite (volume fraction is 3-12%) remains. Therefore, the reasonable range of the C content is 0.04%-0.1%, preferably 0.06-0.08%.

Manganese: Mn is an austenite forming element, which can inhibit the formation of ferrite. At the same time, Mn can reduce the harm of S in the weld and decrease the tendency of forming hot cracking in the weld. However, too high Mn content promotes the formation of the a phase. According to the calculation results in FIG. 2, in order to avoid the formation of a large number of a phases in the weld in the process of aging, the disclosure limits the Mn content to less than 1.0%, and the upper limit content (3.5%) is significantly decreased compared with YT-304H welding wire. The reduction of the Mn content can cause the formation of a small amount of ferrite in the weld, obviously improves the hot cracking resistance capability, and can make up for the adverse effect of lack of S on hot cracking. If the Mn content is too low, on the one hand, it will affect the desulfurization effect, and meanwhile obviously increases the ferrite in the weld to affect its aging and creep performances. Therefore, the Mn content is controlled to 0.4-1.5%, preferably 0.6-1.0%.

Nickel: the ability of the Ni element to stabilize the austenite is stronger than that of the Mn element, and meanwhile can inhibit the formation of the a phase. However, considering that Ni promotes the precipitation and aggregation of $M_{23}C_6$ carbides at the grain boundary, the disclosure reduces the upper limit of the Ni content from 18% of YT-304H welding wire to 12.5%. The nickel content range stipulated by the disclosure is 7.5-12.5%. In order to avoid excessive ferrite in the weld, 8.5%-12.5% is preferred.

Silicon: Si can take a deoxidation effect in the welding wire and improve the fluidity of metal in a molten pool, and thus the addition amount of Si in the welding material can be slightly higher than that of a base metal. However, Si magnifies the hot cracking sensitivity of austenitic weld. At the same time, Si is a strong ferrite forming element. In order to avoid the formation of excessive ferrite in the weld, the upper limit of the Si content stipulated by the disclosure is 0.5%, which is slightly higher than the upper limit content (0.3%) of Super304H base metal.

Chromium: Cr is the most important element to ensure steam oxidation resistance and corrosion resistance of the weld. With the increase of the Cr content, the steam corrosion resistance of the weld is better. However, Cr is a ferrite forming element. If the content of Cr is too high, the weld will produce excessive ferrite and promote the formation of the σ phase. Therefore, the Cr content in the disclosure is controlled to 17.0-19.0%, which is the same as the content range of Super304H base metal, and lower than the upper limit content (20.0%) recommended by the YT-304H welding wire and related patents.

Molybdenum: Mo can improve the high temperature strength of the weld, a small amount of Mo can also improve the corrosion resistance of the material, but Mo is a ferrite forming element and promotes the formation of the a phase, thus in the disclosure, no Mo or a small amount of Mo is added, the upper limit thereof is controlled within 0.4%, which is significantly lower than about 0.9% of Mo content added in YT-304H. The content of Mo is preferably 0-0.2% to minimize the formation of the a phase to the greatest extent.

Copper: Cu, as a fine dispersion copper rich phase, is precipitated out under service conditions, which can significantly improve the high temperature creep strength of the weld. When the content of Cu is less than 2.5%, the strengthening effect is limited, but when the content of Cu is more than 4%, the endurance strength and plasticity of the material are both reduced, and the hot cracking sensitivity of the weld are possibly magnified. In the disclosure, the content range of Cu is determined to 2.5-3.5%.

Niobium: Nb is a strong carbide forming element. It forms fine MX type precipitates with C and N. It is very stable at high temperature and improves the high temperature creep strength of the weld. In addition, Nb can be preferably combined with C, which can reduce the formation of $M_{23}C_6$ carbide at the grain boundary and is beneficial to preventing aging embrittlement and inter-granular corrosion. However, Nb is prone to segregate in the weld, which increases the hot cracking sensitivity. Therefore, in the disclosure, the Nb content is controlled to 0.3%-0.6%, which is the same as the Nb content range of the Super304H base metal, lower than the Nb content (0.5-1.0%) recommended by the YT-304H welding wire and related patents.

Nitrogen: Addition of N can form stable strengthening phases such as NbN and NbCrN, produce an obvious precipitation strengthening effect, and improve the high temperature creep strength of the weld. However, like C, N is a strong austenitizing element. If the content of N is too high, the formation of ferrite will be completely inhibited, and a double-phase structure is difficultly obtained, and the too high N content reduces the plasticity when in long-term aging. In the disclosure, the N content range is 0.05-0.12%, and the upper limit is lower than the upper limit content (0.25%) recommended by the YT-304H welding wire and related patents.

Sulfur and phosphorus: S and P are inevitable impurity elements in the weld. They not only reduce the creep fracture plasticity of the weld, but also increase the hot cracking tendency of the single-phase austenitic weld. Therefore, the requirement on the S and P contents of the welding wire is lower than that of the Super304H base metal. Considering that the weld of the welding wire of the disclosure is of the austenitic+a small amount of ferrite (volume fraction is 3-12%) structure, and the hot cracking resistance is better than that of the single-phase austenitic weld, thus the contents of impurity elements such as S and P can be appropriately broadened. In the disclosure, the contents of S and P are controlled within 0.01% and 0.02% respectively.

The structure features and properties of the Super304H steel joint welded by the welding wire of the disclosure are as follows:

(1) the weld is of a double-phase structure of austenite+a small amount of ferrite (volume fraction is 3-12%);

(2) the tensile strength of the welded joint at room temperature meets the requirements of Super304H steel ≥590 MPa;

(3) the room-temperature impact energy $KV_2$ of the weld after 650° C./5000 h aging is not less than 41 J;

(4) the creep rupture strength of the welded joint at 650° C./$10^4$ h is not less than 170 MPa, which is close to the average creep strength value of Super304H steel.

Compared with the composition design of the existing Super304H steel homogeneous welding wire YT-304H, the disclosure has the following advantages:

(1) By adjusting the contents of two austenite elements (obviously reducing Mn and properly reducing Ni), the microstructure of the weld is changed, and the high temperature service performance of the joint is obviously improved while preventing the hot cracking.

(2) Without addition or only addition of a small amount of valuable element Mo, the requirement of S and P impurity element contents can be appropriately reduced, thereby reducing the material cost.

DETAILED DESCRIPTION OF PREFERRED EMBODIMENTS

Next, the technical solution of the disclosure will be further and specifically described through embodiments and in combination with drawings. According to the composition range of the disclosure, a welding wire having a diameter of 2.4 mm is prepared according to a general welding wire preparation process flow: vacuum furnace smelting→forging→wire rod→solution treatment→multiple drawing treatment and hydrogen recession→bright treatment→cutting packaging. The Super304H small caliber tube with the specification of Φ45 mm×9.2 mm is selected to prepare the welded joint by using the GTAW method. The welding process is that current is 90-110 A, voltage is 11-13V, interlayer temperature is ≤100° C., gas flow is 9-10 L/min, and welding speed is 60-100 mm/min. Table 1 lists typical chemical components of three groups of examples of the welding wires of the disclosure and two comparison example welding wires, wherein 1 #-3 # are the welding wires of the disclosure for trial production; 4 # is a comparison example welding wire for trial production, in which wire the C content is obviously reduced, about 0.9% of Mo is added, and other element components are similar to those of 1 #-3 #. Table 1 is used to explain the influence of formation of excessive ferrite in the weld on the high temperature service performance. 5 # is a typical component of a YT-304H welding wire.

TABLE 1

Components of welding wires in examples and comparison examples (wt %)

| Number | C | Si | Mn | P | S | Cr | Ni | Cu | Mo | N | Nb | Fe |
|---|---|---|---|---|---|---|---|---|---|---|---|---|
| 1# | 0.08 | 0.20 | 0.91 | 0.014 | 0.005 | 18.47 | 9.53 | 2.83 | 0.05 | 0.08 | 0.42 | balance |
| 2# | 0.07 | 0.23 | 0.85 | 0.008 | 0.005 | 18.42 | 9.40 | 2.91 | 0.08 | 0.08 | 0.41 | balance |
| 3# | 0.08 | 0.21 | 0.94 | 0.008 | 0.006 | 18.52 | 9.34 | 2.96 | 0.06 | 0.09 | 0.43 | balance |
| 4# | 0.01 | 0.26 | 0.83 | 0.007 | 0.004 | 18.33 | 9.30 | 2.93 | 0.84 | 0.09 | 0.40 | balance |
| 5# | 0.11 | 0.19 | 3.29 | 0.006 | 0.004 | 18.70 | 16.04 | 2.94 | 0.87 | 0.21 | 0.67 | balance |

The test results of room-temperature mechanical properties of the welded joints of the welding wires of the disclosure are listed in Table 2. It can be seen from Table 2 that the room-temperature tensile strength of the joint of the welding wire of the disclosure meets a requirement that the room-temperature tensile strength of the joint of the Super304H steel is not less than 590 MPa, stipulated by ASME SA213-2010 and GB5310-2008, and the joint has good plasticity.

TABLE 2

Test results of room-temperature mechanical properties of joints of examples and comparison examples

| Number | $R_m$ (MPa) | Bending |
|---|---|---|
| 1# | 610 | Bend to 180° no crack |
| 2# | 610 | Bend to 180° no crack |
| 3# | 610 | Bend to 180° no crack |
| 4# | 610 | Bend to 180° no crack |
| 5# | 625 | Bend to 180° no crack |

The impact test results of the weld of the welding wire of the disclosure after high temperature aging are listed in Table 3. It can be seen from the Table 3 that the room-temperature impact energy of the welding wire of the disclosure after long-term aging exceeds 41 J, which is 1.8 times of that of the YT-304H welding wire. Due to excessive ferrite content, the impact energy of the weld of the 4 # welding wire after aging is significantly lower than that of the 1 # weld, which is close to that of YT-304H weld (5 #), indicating that the high ferrite content leads to obvious aging embrittlement occurring in the weld.

TABLE 3

Room-temperature impact energy $KV_2$ (J) of weld in examples and comparison examples after 650° C. aging

| | Time | | | |
|---|---|---|---|---|
| Number | 500 h | 1000 h | 3000 h | 5000 h |
| 1# | 77 | 65 | 56 | 44 |
| 4# | 49 | 41 | 28 | 23 |
| 5# | 41 | 37 | 25 | 24 |

Note:
1) the size of the sample is 7.5 mm × 10 mm × 55 mm, and data in Table 3 are numerical values converted to values of the standard sample (10 mm × 10 mm × 55 mm);
2) the notch is in the center of weld of welded joint.

Figure 4:
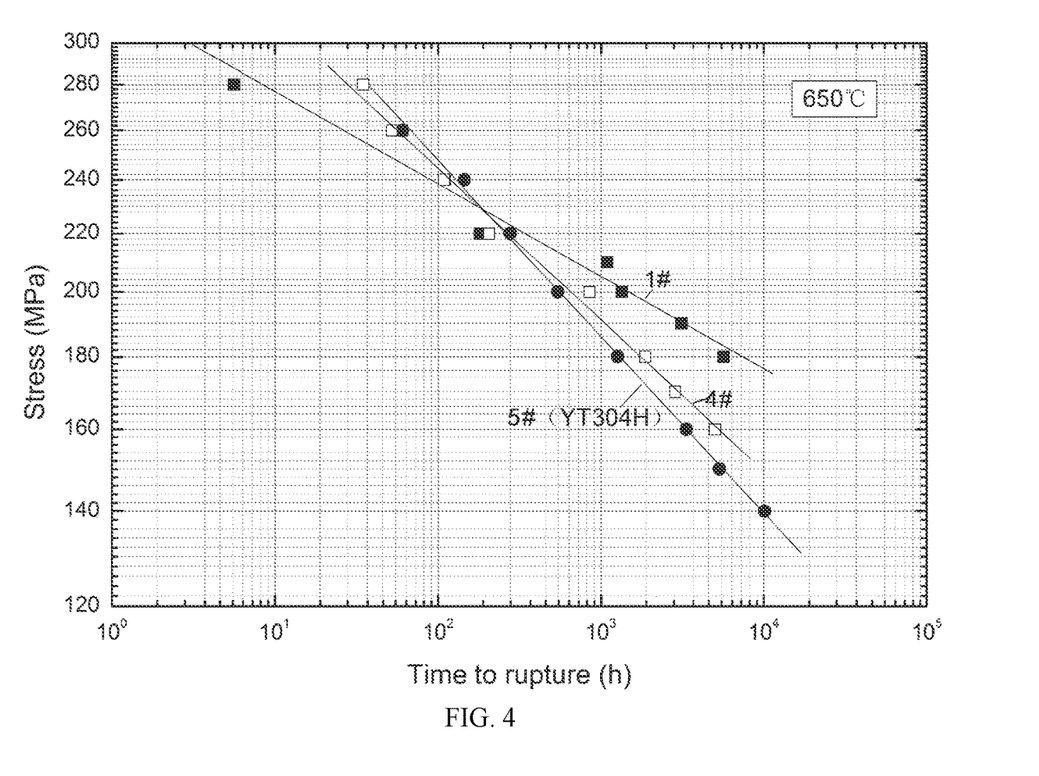
FIG. 4 is comparison of endurance strengths of joints of a welding wire example (1 #) of the disclosure, a comparison example welding wire (4 #) and a YT-304H welding wire (5 #).

The creep fracture strength test results of the welded joints of the welding wires of the disclosure are listed in Table 4. From an endurance curve shown in Table 4 and FIG. 4, it can be seen that under the condition of low stress creep, the fracture service life of 1 # welding wire joint is significantly higher than that of a YT-304H welding (5 #) wire joint, and its advantages are more and more obvious with the decrease of test stress. According to the endurance curve, the creep rupture strength of the welding wire joint at 650° C./$10^4$ h is extrapolated as 176 MPa, which is equivalent to the average value of the endurance strength (175 Mpa) of the Super304H steel. This shows that the 1 # welding wire joint has better high-temperature creep resistance under service conditions. The creep rupture strength of the 4 # welding wire joint is slightly better than that of the YT-304H welding wire joint, but significantly lower than that of the 1 # welding wire joint, which indicates that the excessive ferrite in the weld has a great adverse effect on the creep performance of the joint.

TABLE 4

Endurance fracture time (h) of the joints of welding wires in examples and comparison examples under different stresses at 650° C.

| | Number | | |
|---|---|---|---|
| Stress | 1# | 4# | 5# |
| 280 MPa | 5.6 | 34.8 | — |
| 260 MPa | 60.3 | 51.9 | 60.8 |
| 240 MPa | 110.1 | 108.8 | 145.8 |
| 220 MPa | 181.9 | 206.9 | 277.8 |
| 210 MPa | 1098.2 | — | — |
| 200 MPa | 1339.1 | 849.9 | 544.2 |
| 190 MPa | 3112 | — | — |
| 180 MPa | 5654.7 | 1871.6 | 1268.7 |
| 170 MPa | — | 2841.2 | — |
| 160 MPa | — | 5037 | 3344.4 |
| 150 MPa | — | — | 5363.6 |
| 140 MPa | — | — | 10142.4 |

In conclusion, compared with the existing Super304H steel homogeneous welding wire, the welding wire of the disclosure obviously improves the high-temperature creep resistance of the joint and the aging embrittlement resistance of the weld on the premise of ensuring the room temperature mechanical properties of the joint. The weld of the welding wire has a double-phase structure of austenite+a small amount of ferrite, and also has better hot cracking resistance capability. Compared with the nickel-based welding wire, this welding wire has the advantages of good process performance and low cost.

The protection scope of the disclosure is not limited to the above examples. Obviously, those skilled in the art can make various changes and deformations to the disclosure without departing from the scope and spirit of the disclosure. If these changes and deformations belong to the scope of the claims and equivalent technologies of the disclosure, the intention of the disclosure is also included within these changes and deformations.

We claim:

1. A Super304H steel welding wire capable of resisting high-temperature creep and aging embrittlement, consisting of following chemical components in percentage by mass: 0.04-0.1% of C, 0.83-1.0% of Mn, 9.34-12.5% of Ni, ≤50.5% of Si, 17.0-19.0% of Cr, 0.05-0.2% of Mo, 2.5-3.5% of Cu, 0.3-0.6% of Nb, 0.05-0.12% of N, ≤0.01% of S, 0.014-0.02% of P and the balance of Fe and other inevitable impurity elements; wherein the Super304H steel welding wire forms a double-phase structure of austenite and ferrite: volume fraction of the ferrite in the double-phase structure is 3-12%.

2. The Super304H steel welding wire capable of resisting high-temperature creep and aging embrittlement according to claim 1, wherein C: 0.06-0.08%.

3. The Super304H steel welding wire capable of resisting high-temperature creep and aging embrittlement according to any one of claim 1, wherein a welding method used in application of the welding wire in Super304H steel welding is argon tungsten-arc welding.

4. The Super304H steel welding wire capable of resisting high-temperature creep and aging embrittlement according to claim 3, wherein when the diameter of the welding wire is 1.0 mm, the welding current is 140-200 A, the arc voltage is 9-11V the wire feed speed is 85-350 mm/min, the protective gas flow is 16-20 L/min, and the interlayer temperature is controlled below 100° C.

5. The Super304H steel welding wire capable of resisting high-temperature creep and aging embrittlement according to claim 3, wherein when the diameter of the welding wire is 2.4 mm, the welding current is 80-110 A, the arc voltage is 9-14 V, the welding speed is 50-100 nim/min, the protective gas flow is 8-10 L/min, and the interlayer temperature is controlled below 100° C.

* * * * *